(12) United States Patent
Mikoshiba

(10) Patent No.: US 7,504,197 B2
(45) Date of Patent: *Mar. 17, 2009

(54) OPTICAL INFORMATION RECORDING MEDIUM

(75) Inventor: Hisashi Mikoshiba, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 269 days.

This patent is subject to a terminal disclaimer.

(21) Appl. No.: 10/737,815

(22) Filed: Dec. 18, 2003

(65) Prior Publication Data

US 2004/0126702 A1 Jul. 1, 2004

(30) Foreign Application Priority Data

Dec. 27, 2002 (JP) ........................ P.2002-381013

(51) Int. Cl.
*G11B 7/24* (2006.01)
(52) U.S. Cl. .................. 430/270.15; 430/945; 369/288; 369/284; 428/64.8
(58) Field of Classification Search ........................ None
See application file for complete search history.

(56) References Cited

U.S. PATENT DOCUMENTS

| | | | | |
|---|---|---|---|---|
| 4,614,521 A | * | 9/1986 | Niwa et al. ..................... 8/471 |
| 5,389,419 A | * | 2/1995 | Maeda et al. ................ 428/64.8 |
| 5,633,106 A | * | 5/1997 | Aihara et al. ................... 430/21 |
| 5,855,979 A | * | 1/1999 | Umehara et al. ............. 428/64.1 |
| 6,284,877 B1 | | 9/2001 | Okamoto et al. |
| 6,534,636 B2 | * | 3/2003 | Wang et al. .................. 534/707 |
| 7,011,875 B2 | * | 3/2006 | Watanabe et al. ........... 428/64.1 |
| 2001/0044001 A1 | * | 11/2001 | Noguchi et al. ............. 428/64.3 |
| 2002/0168513 A1 | * | 11/2002 | Hattori et al. ................ 428/336 |
| 2003/0006516 A1 | * | 1/2003 | Berneth et al. ............... 264/1.33 |

FOREIGN PATENT DOCUMENTS

| | | | |
|---|---|---|---|
| JP | 04-169285 | * | 6/1992 |
| JP | 06-206382 | * | 7/1994 |
| JP | 08-295811 | * | 11/1996 |
| JP | 10-058828 | * | 3/1998 |
| JP | 10-086519 | * | 4/1998 |
| JP | 11-048612 | * | 2/1999 |
| JP | 11-334205 | * | 12/1999 |
| JP | 2000-168237 | * | 6/2000 |
| JP | 2000-190641 | * | 7/2000 |
| JP | 2002-200848 | * | 7/2002 |
| JP | 2002-283731 | * | 10/2002 |
| WO | 02/083662 | * | 10/2002 |
| WO | 02/083795 | * | 10/2002 |

OTHER PUBLICATIONS

Hutchings et al., "Colour and constitution of azo compounds derived from diaminoazines", Tetrahedron vol. 40(24) pp. 5081-5088 (1984).*

* cited by examiner

*Primary Examiner*—Martin J Angebranndt
(74) *Attorney, Agent, or Firm*—Sughrue Mion, PLLC

(57) ABSTRACT

An optical information recording medium containing a substrate having provided thereon a recording layer capable of recording information by laser beam irradiation, wherein the recording layer contains a dye represented by the following general formula (I):

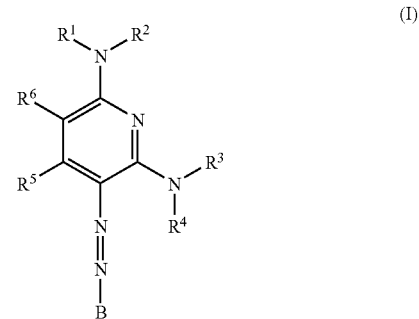

wherein $R^1$, $R^2$, $R^3$ and $R^4$ each independently represents a hydrogen atom or a substituent group; $R^5$ and $R^6$ each independently represents a hydrogen atom or a substituent group; and B represents a substituted or unsubstituted aryl group or a substituted or unsubstituted heterocyclic group, which are derivable from a diazonium salt.

8 Claims, No Drawings

OPTICAL INFORMATION RECORDING MEDIUM

BACKGROUND OF THE INVENTION

1. Field of the Invention

The present invention relates to an optical information recording medium capable of recording and reproducing information by a laser beam. In particular, the invention relates to a heat mode type optical information recording medium containing an azo dye of a specific structure and suitable for recording information by a laser beam.

2. Description of the Related Art

Information recording media (optical disks) which can record information only once with laser beams have hitherto been known. These optical disks are also called write once-type CDs (so-called CD-Rs), and have the typical structure that a recording layer comprising an organic dye, a light reflective layer comprising a metal such as gold, and further a resin protective layer are provided on a transparent disk-shaped substrate in this order in a laminated state. Information is recorded on the CD-R by irradiating the CD-R with a near infrared laser beam (usually, a laser beam having a wavelength of about 780 nm). The irradiated portion of the recording layer absorbs the laser beam to locally elevate the temperature, which produces a physical or chemical change (for example, formation of pits) to alter the optical characteristics thereof, thereby recording the information. On the other hand, reading (reproduction) of the information is usually carried out by irradiating a laser beam having the same wavelength as the laser beam for recording to detect the difference in reflectance between a deformed site (recorded area) of the recording layer by heat generation and a non-deformed site (non-recorded area).

In recent years, information recording media higher in recording density have been desired. In order to meet such a request, optical disks called write once-type digital versatile disks (so-called DVD-Rs) have been commercially available. The DVD-R of this type has the structure that two disks each comprising a transparent disk-shaped substrate on which a guide groove (pre-groove) for tracking a laser beam irradiated is formed at a track pitch (0.74 to 0.8 µm) equal to or narrower than half that of the CD-R, having provided thereon a recording layer comprising a dye, usually a light reflective layer and further a protective layer as needed in this order, or the disk and a disk-shaped protective substrate having substantially the same dimension as that of the disk are adhered to each other with an adhesive, facing the recording layer inside relative to the substrates. Recording and reproduction of information in the DVD-R are carried out by irradiation of a visible laser beam (usually, a laser beam having a wavelength ranging from 630 to 680 nm), and it is said that higher density recording than that of the CD-R is possible. As the dyes used in such optical recording materials, azo metal chelate dyes formed from azo dyes and metals are disclosed. Typical examples thereof are disclosed in JP-A-63-9577, JP-A-63-9578, JP-A-63-9579, JP-A-3-268994, JP-A-8-156408 and JP-A-9-277703 (the term "JP-A" as used herein means an "unexamined Japanese patent publication")

Recently, high-vision television and networks such as the Internet have rapidly become widespread. Further, the start of HDTV (High Definition Television) broadcasting comes near, and a demand for large-capacity optical media for recording image information inexpensively and easily is glowing. Although the DVD-Rs secure a position as the large-capacity recording media to some degree, it is not said that they have such a sufficiently large recording capacity that a future demand can be coped with. Consequently, the development of optical disks having a larger recording capacity has been advanced in which a laser beam having a shorter wavelength than that in the DVD-Rs is used, thereby improving recording density.

In an optical information recording medium having an organic dye-containing recording layer, there is disclosed a recording and reproducing method for carrying out recording and reproduction of information by irradiating the medium with a laser beam having a wavelength of 530 nm or less from the recording layer side to the light reflective layer side. Specifically, there is proposed an information recording and reproducing method for carrying out recording and reproduction of information by irradiating an optical disk using a porphyrin compound, an azo dye, a metal azo dye, a quinophthalone dye, a trimethinecyanine dye, a dicyanovinylphenyl skeleton dye, a coumarin compound, a naphthalocyanine compound or the like as the dye of the recording layer with a blue (wavelength: 405 nm, 488 nm) or blue-green (wavelength: 515 nm) laser beam.

SUMMARY OF THE INVENTION

However, studies of the present inventors have revealed that the optical disks using the known dyes described in the above-mentioned patent documents are not on a satisfactory level in recording characteristics such as reflectance and modulation degree, and further insufficient in storage stability, which requires further improvements.

On the other hand, in order to produce an optical recording disk at low cost, a method of dissolving a dye in a solvent to prepare an ink (coating solution) and applying the ink by spin coating is preferably used. However, when the solubility or dissolution stability of the dye used in the optical recording disk to the solvent is lacking, there is the problem that the production of the disk by coating is impossible. Further, problems arise with regard to dye coating properties and drying load which matter in producing the disk. The present inventors have discovered that the above-mentioned problems can be solved by the use of an azo dye having a specific structure, thus completing the invention.

The invention has been made in view of the above-mentioned problems of the related art, and a first object of the invention is to provide an optical information recording medium capable of performing high-density recording and reproduction of information by irradiation of a laser beam having a short wavelength of 600 to 680 nm and/or a laser beam having a wavelength of 450 nm or less, and having excellent recording characteristics.

A second object of the invention is to provide an optical information recording medium competent to store recorded information for a long period of time by designing a recording layer stable against light, high temperature and high humidity.

A third object of the invention is to provide a dye improved in dye solubility, coating properties and drying load which matter in producing a disk.

The problems of the invention have been solved by the following constitutions:

(1) An optical information recording medium comprising a substrate having provided thereon a recording layer capable of recording information by laser beam irradiation, wherein the recording layer contains a dye represented by the following general formula (I):

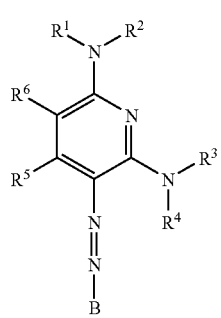

(I)

wherein R¹, R², R³ and R⁴ each independently represents a hydrogen atom or a substituent group; R⁵ and R⁶ each independently represents a hydrogen atom or a substituent group; and B represents a substituted or unsubstituted aryl group or a substituted or unsubstituted heterocyclic group, which is derivable from a diazonium salt;

(2) The optical information recording medium described in (1), wherein R¹, R², R³ and R⁴ in general formula (I) each independently represents a hydrogen atom, a substituted or unsubstituted alkyl group, a substituted or unsubstituted aryl group or a substituted or unsubstituted heterocyclic group; R⁵ and R⁶ each independently represents a hydrogen atom or a substituent group; and B represents a substituted or unsubstituted aryl group or a substituted or unsubstituted heterocyclic group, which is derivable from a diazonium salt;

(3) An optical information recording medium comprising a substrate having provided thereon a recording layer capable of recording information by laser beam irradiation, wherein the recording layer contains a metal azo chelate dye formed from a metal or a metal oxide and a dye represented by the following general formula (I):

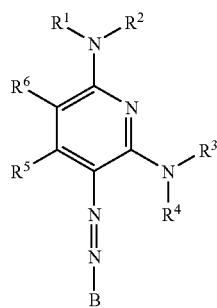

(I)

wherein R¹, R², R³ and R⁴ each independently represents a hydrogen atom or a substituent group; R⁵ and R⁶ each independently represents a hydrogen atom or a substituent group; and B represents a substituted or unsubstituted aryl group or a substituted or unsubstituted heterocyclic group, which is derivable from a diazonium salt;

(4) The optical information recording medium described in any one of (1) to (3), wherein the refractive index (n) of the recording layer is $2.0<n<2.7$, and the linear attenuation coefficient (k) thereof is $0.03<k<0.10$;

(5) The optical information recording medium described in any one of (1) to (3), wherein the dye represented by general formula (I) is represented by the following general formula (II):

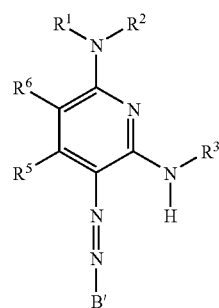

(II)

wherein R¹, R² and R³ each independently represents a hydrogen atom, a substituted or unsubstituted alkyl group, a substituted or unsubstituted aryl group or a substituted or unsubstituted heterocyclic group; R⁵ and R⁶ each independently represents a hydrogen atom or a substituent group; and B' represents a group having a structure selected from the following formulas (a)-1, (a)-2 and (b) to (1):

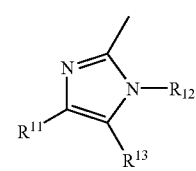

(a)-1

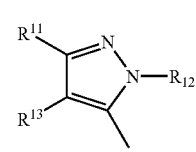

(a)-2

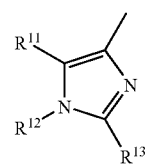

(b)

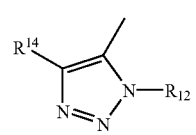

(c)

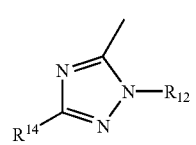

(d)

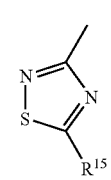

(e)

-continued (f)
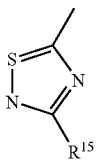

(g)
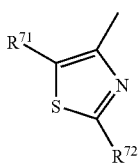

(h)
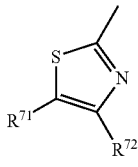

(i)
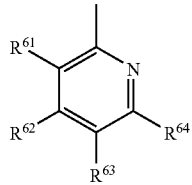

(j)
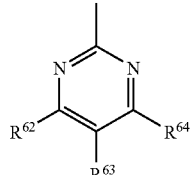

(k)
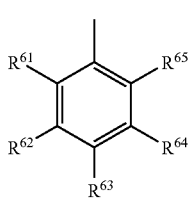

(l)
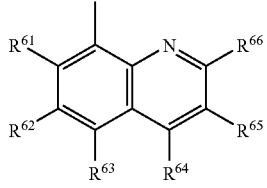

wherein $R^{11}$, $R^{12}$, $R^{13}$, $R^{14}$, $R^{15}$, $R^{61}$, $R^{62}$, $R^{63}$, $R^{64}$, $R^{65}$, $R^{66}$, $R^{71}$ and $R^{72}$ each independently represents a hydrogen atom or a substituent group.

DETAILED DESCRIPTION OF THE INVENTION

Embodiments of the optical information recording medium of the invention will be described in detail below.

An optical information recording medium of the invention comprises a substrate having provided thereon a recording layer capable of recording information by laser beam irradiation, wherein the recording layer contains an azo chelate dye having a specific structure represented by general formula (I) and/or a metal azo chelate dye.

In formula (I), $R^1$, $R^2$, $R^3$ and $R^4$ each independently represents a hydrogen atom or a substituent group. Specific examples thereof include ones described later in descriptions of $R^5$ and $R^6$. Of these, preferred is a hydrogen atom, a substituted or unsubstituted alkyl group, a substituted or unsubstituted aryl group, a substituted or unsubstituted heterocyclic group, a substituted or unsubstituted acyl group, a substituted or unsubstituted aminocarbonyl group, an alkoxycarbonyl group or an aryloxycarboxyl group. More preferred is a hydrogen atom, a substituted or unsubstituted alkyl group, a substituted or unsubstituted aryl group, or a substituted or unsubstituted heterocyclic group. $R^1$ and $R^2$ or $R^3$ and $R^4$ may combine with each other to form a ring structure.

$R^1$, $R^2$, $R^3$ and $R^4$ are each preferably an alkyl group (a substituted or unsubstituted alkyl group having 1 to 20 carbon atoms, for example, methyl, ethyl, n-propyl, n-butyl, n-hexyl, i-propyl, t-butyl, n-octyl, n-octadecyl, 2-methoxyethyl or 3-chloropropyl), an aryl group (a substituted or unsubstituted aryl group having 6 to 20 carbon atoms, for example, phenyl, naphthyl, p-methoxyphenyl, m-chlorophenyl or p-diethylaminophenyl) or a heterocyclic group (for example, a substituted or unsubstituted heterocyclic group having 1 to 20 carbon atoms, for example, 2-pyridyl or 2-furyl). Preferably, either of a pair of $R^1$ and $R^2$ or $R^3$ and $R^4$ is a hydrogen atom, and the other is not a hydrogen atom.

More preferably, either of $R^1$ and $R^2$ is a substituted or unsubstituted alkyl group having 1 to 20 carbon atoms or a substituted or unsubstituted aryl group having 6 to 20 carbon atoms, and the other is a hydrogen atom, and either of $R^3$ and $R^4$ is a substituted or unsubstituted alkyl group having 1 to 20 carbon atoms or a substituted or unsubstituted aryl group having 6 to 20 carbon atoms, and the other is a hydrogen atom.

$R^5$ and $R^6$ each independently represents a hydrogen atom or a substituent group. Examples of the substituent groups include a halogen atom, an alkyl group (including a cycloalkyl group and a bicycloalkyl group), an alkenyl group (including a cycloalkenyl group and a bicycloalkenyl group), an alkynyl group, an aryl group, a heterocyclic group, a cyano group, a hydroxyl group, a nitro group, a carboxyl group, an alkoxyl group, an aryloxy group, a silyloxy group, a heterocyclic oxy group, an acyloxy group, a carbamoyloxy group, an alkoxycarbonyloxy group, an aryloxycarbonyloxy group, an amino group (including an alkylamino group and an arylamino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, phosphino group, a phosphinyl group, a phosphinyloxy group, a phosphinylamino group and a silyl group.

More particularly, $R^5$ and $R^6$ each represents a halogen atom (for example, a chlorine atom, a bromine atom or a iodine atom), an alkyl group [which represents a straight-chain, branched or cyclic substituted or unsubstituted alkyl group, including an alkyl group (preferably, an alkyl group having 1 to 30 carbon atoms, for example, methyl, ethyl, n-propyl, isopropyl, t-butyl, n-octyl, eicosyl, 2-chloroethyl, 2-cyanoethyl or 2-ethylhexyl), a cycloalkyl group (preferably, a substituted or unsubstituted cycloalkyl group having 3 to 30 carbon atoms, for example, cyclohexyl, cyclopentyl or 4-n-dodecylcyclohexyl), a bicycloalkyl group (for example, a substituted or unsubstituted bicycloalkyl group having 5 to 30 carbon atoms, that is to say, a univalent group obtained by eliminating one hydrogen atom from a bicycloalkane having 5 to 30 carbon atoms, for example, bicyclo[1,2,2]heptane-2-yl or bicyclo[2,2,2]octane-3-yl) and further a tricyclo group having a polycyclic structure, an alkyl group contained in a substituent group described below (for example, analkyl group contained in an alkylthio group) also representing an alkyl group having such a concept], an alkenyl group [which represents a straight-chain, branched or cyclic substituted or unsubstituted alkenyl group, including an alkenyl group (preferably, a substituted or unsubstituted alkenyl group having 2 to 30 carbon atoms, for example, vinyl, allyl, prenyl, geranyl or oleyl), a cycloalkenyl group (preferably, a substituted or unsubstituted cycloalkenyl group having 3 to 30 carbon atoms, that is to say, a univalent group obtained by eliminating one hydrogen atom from a cycloalkene having 3 to 30 carbon atoms, for example, 2-cyclopentene-1-yl or 2-cyclohexene-1-yl) and a bicycloalkenyl group (a substituted or unsubstituted bicycloalkenyl group, preferably, a substituted or unsubstituted bicycloalkenyl group having 5 to 30 carbon atoms, that is to say, a univalent group obtained by eliminating one hydrogen atom from a bicycloalkene having one double bond, for example, bicyclo[2,2,1]hepto-2-ene-1-yl or bicyclo[2,2,2]octo-2-ene-4-yl)], an alkynyl group (preferably, a substituted or unsubstituted alkynyl group having 2 to 30 carbon atoms, for example, ethynyl, propargyl or trimethylsilylethynyl), an aryl group (preferably, a substituted or unsubstituted aryl group having 6 to 30 carbon atoms, for example, phenyl, p-tolyl, naphthyl, m-chlorophenyl or o-hexadecanoylaminophenyl), a heterocyclic group (preferably, a univalent group obtained by eliminating one hydrogen atom from a 5- or 6-membered, substituted or unsubstituted, aromatic or nonaromatic heterocyclic compound, and more preferably, a 5- or 6-membered aromatic heterocyclic group, for example, 2-furyl, 2-thienyl, 2-pyrimidinyl or 2-benzothiazolyl), a cyano group, a hydroxyl group, a nitro group, an alkoxyl group (preferably, a substituted or unsubstituted alkoxyl group having 1 to 30 carbon atoms, for example, methoxy, ethoxy, isopropoxy, t-butoxy, n-octyloxy or 2-methoxyethoxy), an aryloxy group (preferably, a substituted or unsubstituted aryloxy group having 6 to 30 carbon atoms, for example, phenoxy, 2-methylphenoxy, 4-t-butylphenoxy, 3-nitrophenoxy or 2-tetradecanoylaminophenoxy), a silyloxy group (preferably, a silyloxy group having 3 to 20 carbon atoms, for example, trimethylsilyloxy or t-butyldimethylsilyloxy), a heterocyclic oxy group (preferably, a substituted or unsubstituted heterocyclic oxy group having 2 to 30 carbon atoms, for example, 1-phenyltetrazole-5-oxy or 2-tetrahydropyranyloxy), an acyloxy group (preferably, a formyloxy group, a substituted or unsubstituted alkylcarbonyloxy group having 2 to 30 carbon atoms or a substituted or unsubstituted arylcarbonyloxy group having 6 to 30 carbon atoms, for example, formyloxy, acetyloxy, pivaloyloxy, stearoyloxy, benzoyloxy or p-methoxyphenylcarbonyloxy), a carbamoyloxy group (preferably, a substituted or unsubstituted carbamoyloxy group having 1 to 30 carbon atoms, for example, N,N-dimethylcarbamoyloxy, N,N-diethylcarbamoyloxy, morpholinocarbonyloxy, N,N-di-n-octylaminocarbonyloxy or N-n-octylcarbamoyloxy), an alkoxycarbonyloxy group (preferably, a substituted or unsubstituted alkoxycarbonyloxy group having 2 to 30 carbon atoms, for example, methoxycarbonyloxy, ethoxycarbonyloxy, t-butoxycarbonyloxy or n-octylcarbonyloxy), an aryloxycarbonyloxy group (preferably, a substituted or unsubstituted aryloxycarbonyloxy group having 7 to 30 carbon atoms, for example, phenoxycarbonyloxy, p-methoxyphenoxycarbonyloxy or p-n-hexadecyloxyphenoxycarbonyloxy), an amino group (preferably, an amino group, a substituted or unsubstituted alkylamino group having 1 to 30 carbon atoms or a substituted or unsubstituted anilino group having 6 to 30 carbon atoms, for example, amino, methylamino, anilino, N-methylanilino or diphenylamino), an acylamino group (preferably, a formylamino group, a substituted or unsubstituted alkylcarbonylamino group having 1 to 30 carbon atoms or a substituted or unsubstituted arylcarbonylamino group having 6 to 30 carbon atoms, for example, formylamino, acetylamino, pivaloylamino, lauroylamino, benzoylamino or 3,4,5-tri-n-octyloxyphenylcarbonylamino), an aminocarbonylamino group (preferably, a substituted or unsubstituted aminocarbonylamino group having 1 to 30 carbon atoms, for example, carbamoylamino, N,N-dimethylaminocarbonylamino, N,N-diethylaminocarbonylamino or morpholinocarbonylamino), an alkoxycarbonylamino group (preferably, a substituted or unsubstituted alkoxycarbonylamino group having 2 to 30 carbon atoms, for example, methoxycarbonylamino, ethoxycarbonylamino, t-butoxycarbonylamino, n-octadecyloxycarbonylamino or N-methylmethoxycarbonylamino), an aryloxycarbonylamino group (preferably, a substituted or unsubstituted aryloxycarbonylamino group having 7 to 30 carbon atoms, for example, phenoxycarbonylamino, p-chlorophenoxycarbonylamino or m-n-octyloxyphenoxycarbonylamino), a sulfamoylamino group (preferably, a substituted or unsubstituted sulfamoylamino group having 0 to 30 carbon atoms, for example, sulfamoylamino, N,N-dimethylaminosulfonylamino or N-n-octylaminosulfonylamino), an alkylsulfonylamino group or an arylsulfonylamino group (preferably, a substituted or unsubstituted alkylsulfonylamino group having 1 to 30 carbon atoms or a substituted or unsubstituted arylsulfonylamino group having 6 to 30 carbon atoms, for example, methylsulfonylamino, butylsulfonylamino, phenylsulfonylamino, 2,3,5-trichlorophenylsulfonylamino or p-methylphenylsulfonylamino), a mercapto group, an alkylthio group (preferably, a substituted or unsubstituted alkylthio group having 1 to 30 carbon atoms, for example, methyltio, ethylthio or n-hexadecylthio), an arylthio group (preferably, a substituted or unsubstituted arylthio group having 6 to 30 carbon atoms, for example, phenylthio, p-chlorophenylthio or m-methoxyphenylthio), a heterocyclic thio group (preferably, a substituted or unsubstituted heterocyclic thio group having 2 to 30 carbon atoms, for example, 2-benzothiazolylthio or 1-phenyltetrazole-5-ylthio), a sulfamoyl group (preferably, a substituted or unsubstituted sulfamoyl group having 0 to 30 carbon atoms, for example, N-ethylsulfamoyl, N-(3-dodecyloxypropyl)sulfamoyl, N,N-dimethylsulfamoyl, N-acetylsulfamoyl, N-benzoylsulfamoyl or N-(N'-phenylcarbamoyl)-sulfamoyl), a sulfo group, an alkylsulfinyl group or an arylsulfinyl group (preferably, a substituted or unsubstituted alkylsulfinyl group having 1 to 30 carbon atoms or a substituted or unsubstituted arylsulfinyl group having 6 to 30 carbon atoms, for example, methylsulfinyl, ethylsulfinyl, phenylsulfinyl or p-methylphenylsulfinyl), an alkylsulfonyl group or an arylsulfonyl group (preferably, a substituted or unsubstituted alkylsulfonyl group having 1 to 30 carbon atoms or a substituted or unsubstituted arylsulfonyl group having 6 to 30 carbon atoms, for example, methylsulfonyl, ethylsulfonyl, phenylsulfonyl or p-methylphenylsulfonyl), an acyl group (preferably, a formyl group, a substituted or unsubstituted alkylcarbonyl group having 2 to 30 carbon atoms, a substituted or unsubstituted arylcarbonyl group having 7 to 30 carbon atoms or a substituted or unsubstituted heterocyclic carbonyl group having 4 to 30 carbon atoms in which a heterocycle is linked by a carbon atom to a carbonyl group, for example, acetyl, pivaloyl, 2-chloroacetyl, stearoyl, benzoyl, p-n-octyloxyphenylcarbonyl, 2-pyridylcarbonyl or 2-furylcarbonyl), an aryloxycarbonyl group (preferably, a substituted or unsubstituted aryloxycarbonyl group having 7 to 30 carbon atoms, for example, phenoxycarbonyl, o-chlorophenoxycarbonyl, m-nitrophenoxycarbonyl or p-t-butylphenoxycarbonyl), an alkoxycarbonyl group (preferably, a substituted or unsubstituted alkoxycarbonyl group having 2 to 30 carbon atoms, for example, methoxycarbonyl, ethoxycarbonyl, t-butoxycarbonyl or n-octadecyloxycarbonyl), a carbamoyl group (preferably, a substituted or unsubstituted carbamoyl group having 1 to 30 carbon atoms, for example, carbamoyl, N-methylcarbamoyl, N,N-dimethylcarbamoyl, N,N-di-n-octylcarbamoyl or N-(methylsulfonyl)carbamoyl), an arylazo group or a heterocyclic azo group (preferably, a substituted or unsubstituted arylazo group having 6 to 30 carbon atoms or a substituted or unsubstituted heterocyclic azo group having 3 to 30 carbon atoms, for example, phenylazo, p-chlorophenylazo or 5-ethylthio-1,3,4-thiadiazole-2-ylazo), an imido group (preferably, N-succinimido or N-phthalimido), a phosphino group (preferably, a substituted or unsubstituted phosphino group having 2 to 30 carbon atoms, for example, dimethylphosphino, diphenylphosphino or methylphenoxyphosphino), a phosphinyl group (preferably, a substituted or unsubstituted phosphinyl group having 2 to 30 carbon atoms, for example, phosphinyl, dioctyloxyphosphinyl or diethoxyphosphinyl), a phosphinyloxy group (preferably, a substituted or unsubstituted phosphinyloxy group having 2 to 30 carbon atoms, for example, diphenoxyphosphinyloxy or dioctyloxyphosphinyloxy), a phosphinylamino group (preferably, a substituted or unsubstituted phosphinylamino group having 2 to 30 carbon atoms, for example, dimethoxyphosphinylamino or dimethylaminophosphinylamino), or a silyl group (preferably, a substituted or unsubstituted silyl group having 3 to 30 carbon atoms, for example, trimethylsilyl, t-butyldimethylsilyl or phenyldimethylsilyl).

For the functional groups having hydrogen atoms of the above-mentioned functional groups, the hydrogen atoms may be eliminated and further substituted by the above-mentioned groups. Examples of such functional groups include an alkylcarbonylaminosulfonyl group, an arylcarbonylaminosulfonyl group, an alkylsulfonylaminocarbonyl group and an arylsulfonylaminocarbonyl group. Examples thereof include methylsulfonylaminocarbonyl, p-methylphenylsulfonylaminocarbonyl, acetylaminosulfonyl and benzoylaminosulfonyl.

$R^6$ is preferably a hydrogen atom, an unsubstituted alkyl group having 1 to 6 carbon atoms, a substituted or unsubstituted alkoxycarbonyl group having 2 to 20 carbon atoms, a substituted or unsubstituted aminocarbonyl group having 3 to 20 carbon atoms, a carboxyl group or a cyano group.

$R^5$ is preferably a hydrogen atom, a substituted or unsubstituted alkyl group having 1 to 20 carbon atoms or a substituted or unsubstituted aryl group having 6 to 20 carbon atoms, and more preferably an unsubstituted alkyl group having 1 to 6 carbon atoms.

B represents a substituted or unsubstituted aryl group or a substituted or unsubstituted heterocyclic group, which are derivable from a diazonium salt. That is to say, B is a diazo ingredient. The diazo ingredient means a partial structure introducible by diazo coupling reaction of a diazo compound (diazonium salt) converted from a heterocyclic compound or benzene derivative having an amino group as a substituent group with a coupler. This concept is frequently used in the field of azo dyes. In other words, B is a univalent substituent group obtained by eliminating an amino group of an amino-substituted heterocyclic compound or benzene derivative which can be diazotized.

Examples of the univalent heterocyclic groups include the following (A-1) to (A-25):

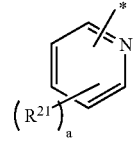
(A-1)

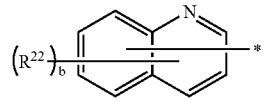
(A-2)

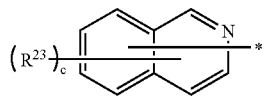
(A-3)

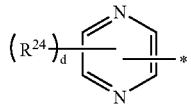
(A-4)

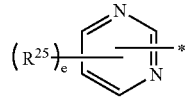
(A-5)

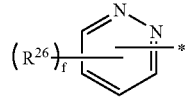
(A-6)

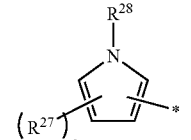
(A-7)

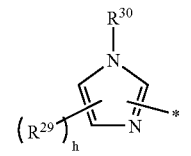
(A-8)

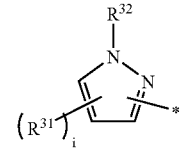
(A-9)

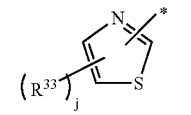
(A-10)

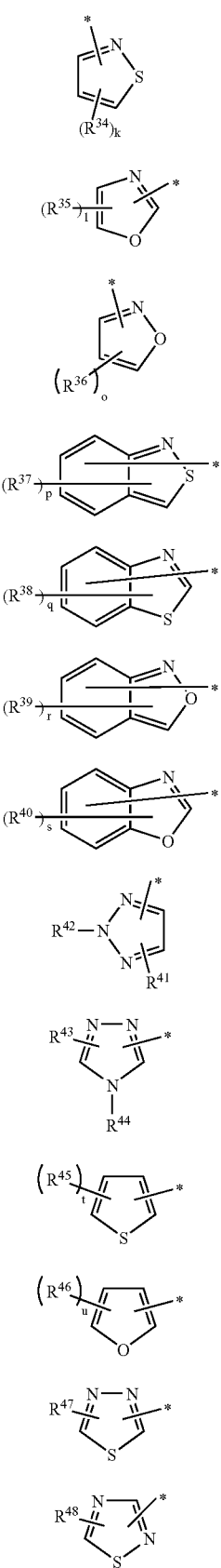
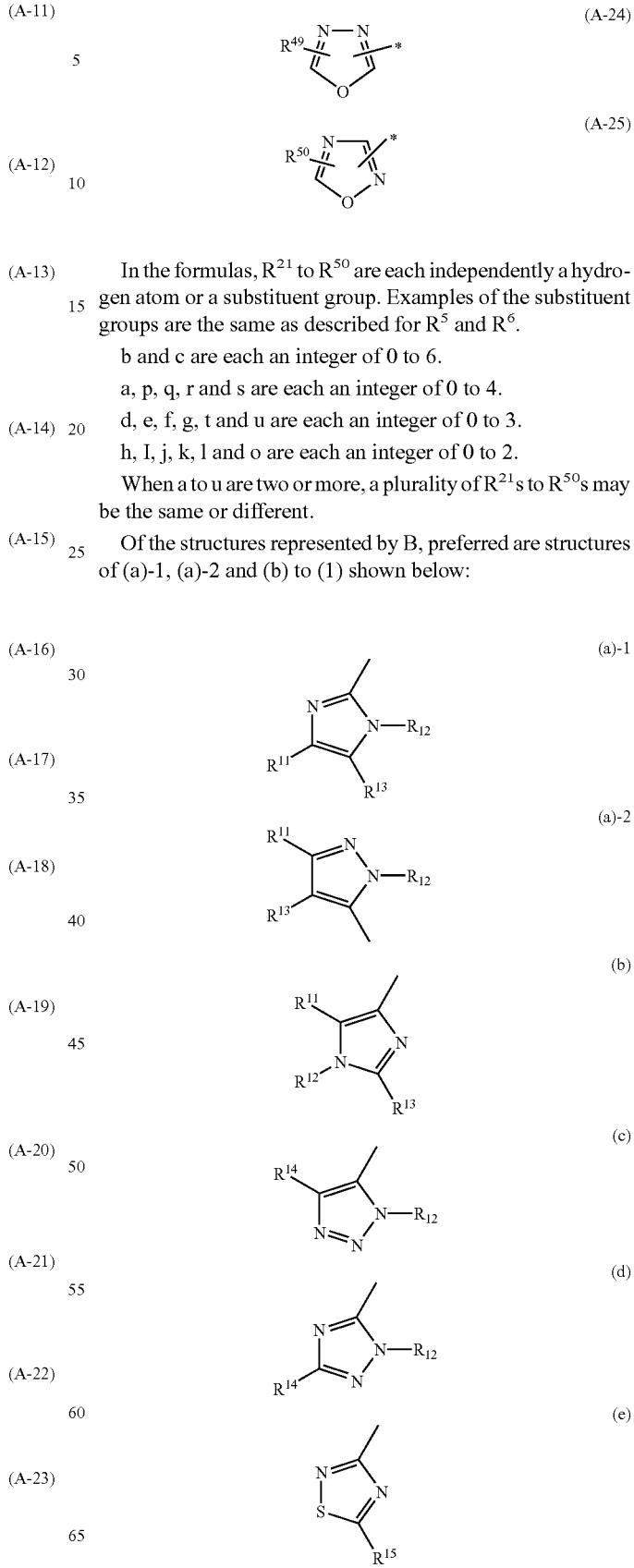

In the formulas, $R^{21}$ to $R^{50}$ are each independently a hydrogen atom or a substituent group. Examples of the substituent groups are the same as described for $R^5$ and $R^6$.

b and c are each an integer of 0 to 6.

a, p, q, r and s are each an integer of 0 to 4.

d, e, f, g, t and u are each an integer of 0 to 3.

h, I, j, k, l and o are each an integer of 0 to 2.

When a to u are two or more, a plurality of $R^{21}$s to $R^{50}$s may be the same or different.

Of the structures represented by B, preferred are structures of (a)-1, (a)-2 and (b) to (1) shown below:

-continued (f)
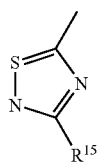

(g)

(h)
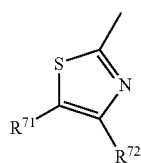

(i)
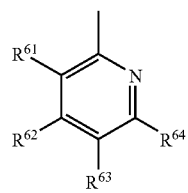

(j)
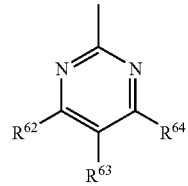

(k)
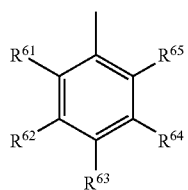

(l)
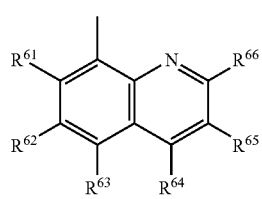

wherein $R^{61}$, $R^{62}$, $R^{63}$, $R^{64}$, $R^{65}$, $R^{66}$, $R^{71}$, $R^{72}$, $R^{11}$, $R^{12}$, $R^{13}$, $R^{14}$ and $R^{15}$ each independently represents a hydrogen atom or a substituent group. Examples of the substituent groups include the substituent groups described above for $R^5$ and $R^6$.

The dye represented by general formula (I) is a dye which indicates a refractive index (n) satisfying preferably 2.0<n<2.7, more preferably 2.10<n<2.50, and a linear attenuation coefficient satisfying preferably 0.03<k<0.10, more preferably 0.03<k<0.09, when the dye is used in a dye layer (recording layer).

The refractive index and the linear attenuation coefficient can be easily measured by ELLIPSO meters. As a measuring device, Model V-VASE-S supplied from J. A. Woollam Co., Inc. can be used.

The dye used in the dye layer (recording layer) is preferably an azo dye having a specific structure represented by the following general formula (II):

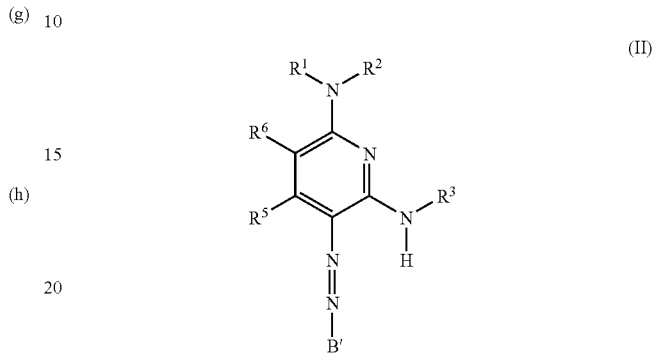

wherein $R^1$, $R^2$ and $R^3$ each independently represents a hydrogen atom, a substituted or unsubstituted alkyl group, a substituted or unsubstituted aryl group or a substituted or unsubstituted heterocyclic group, $R^5$ and $R^6$ each independently represents a hydrogen atom or a substituent group, and B' represent a group having a structure selected from the above-mentioned formulas (a) to (1), wherein $R^{11}$, $R^{12}$, $R^{13}$, $R^{14}$, $R^{15}$, $R^{61}$, $R^{62}$, $R^{63}$, $R^{64}$, $R^{65}$, $R^{66}$ and $R^{71}$, $R^{72}$ each independently represents a hydrogen atom or a substituent group.

Of these, preferred is one in which $R^1$, $R^2$ and $R^3$ are each a hydrogen atom, a substituted or unsubstituted alkyl group, a substituted or unsubstituted aryl group or a substituted or unsubstituted heterocyclic group, $R^5$ is an alkyl group, $R^6$ is a hydrogen atom, a carboxyl group, a cyano group or an aminocarbonyl group, and B' is a group having a structure represented by formula (f), (a)-2 or (a)-1.

Specific examples of the dye compounds used in the invention will be exemplified below, but the invention should not be construed as being limited thereby.

1.

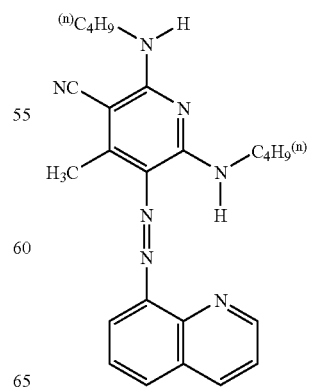

2.
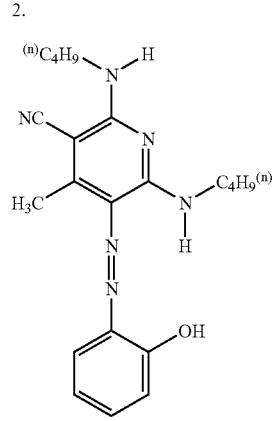
3.
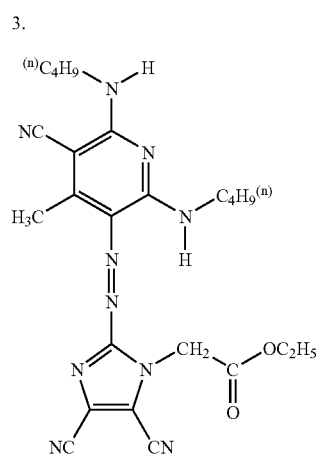
4.
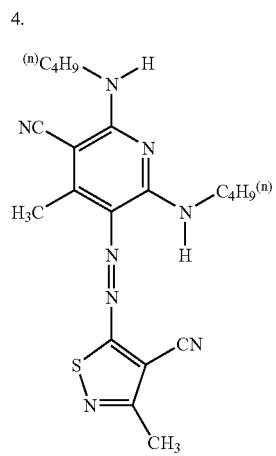
5.
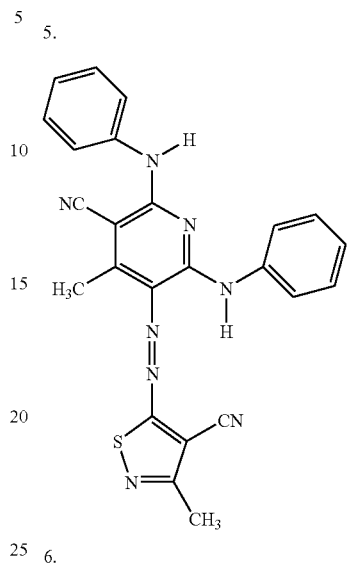
6.
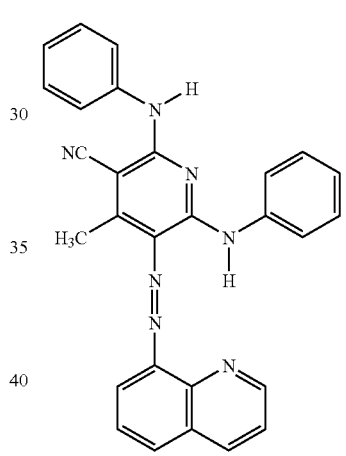
7.
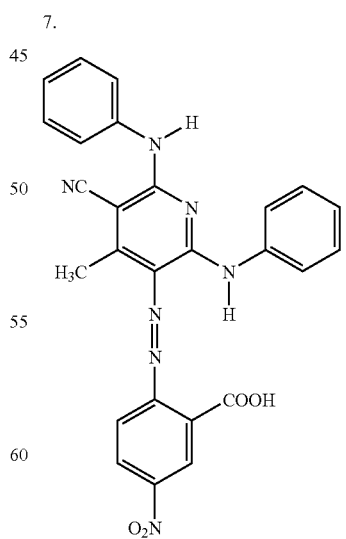

8.
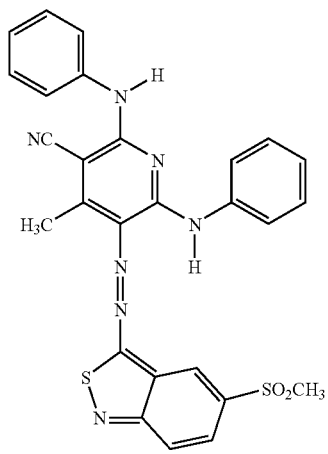
9.
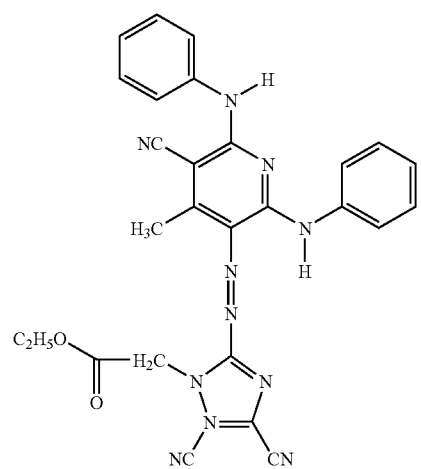
10.
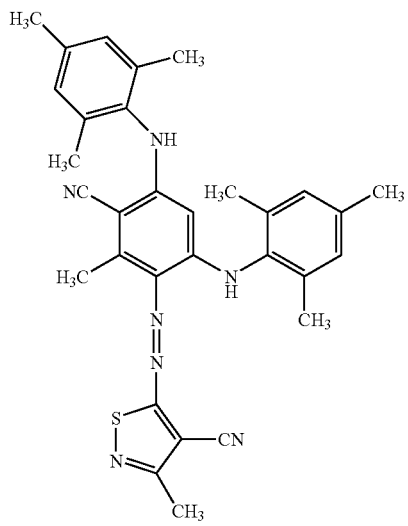
11.
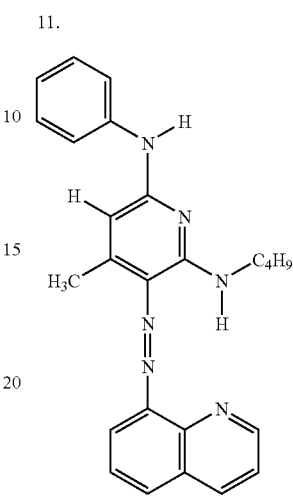
12.
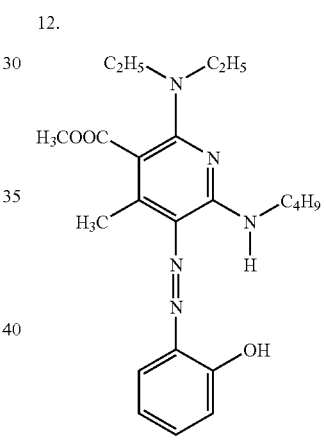
13.
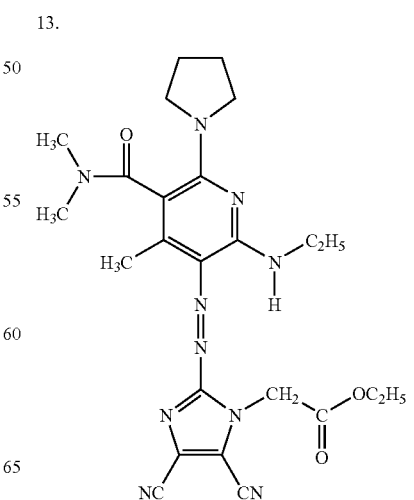

-continued
14.
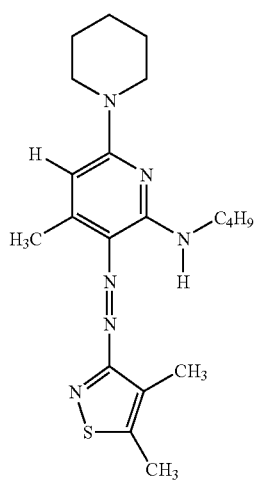
15.
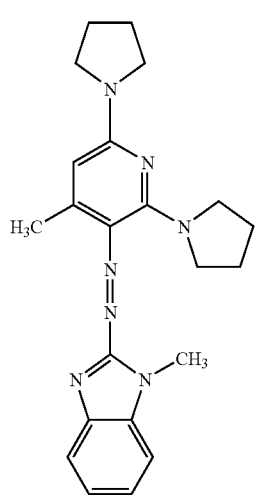
16.
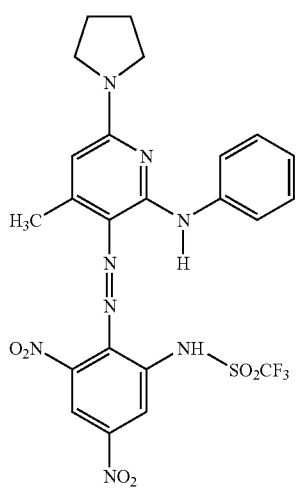
-continued
17.
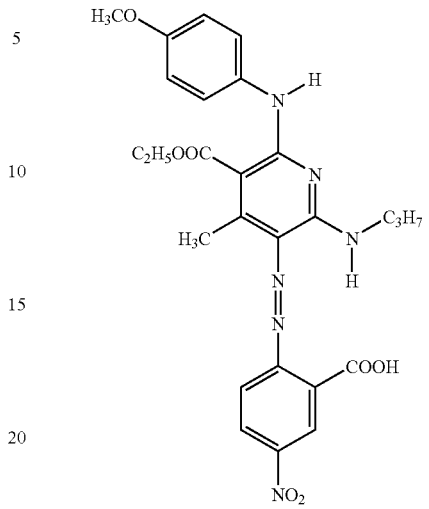
18.
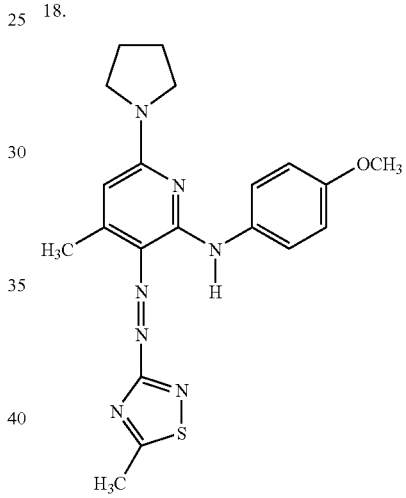
19.
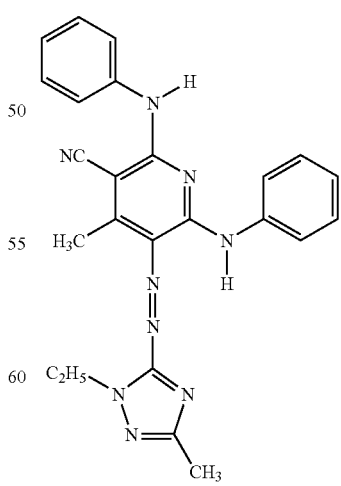

20.
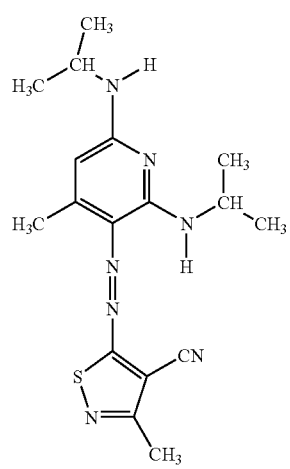
21.
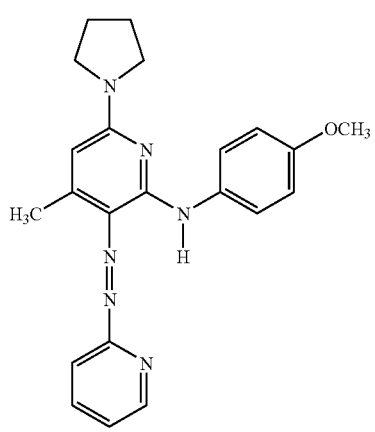
22.
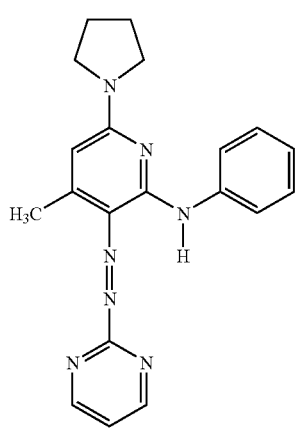
23.
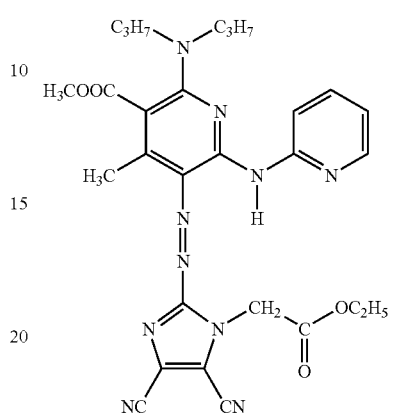
24.
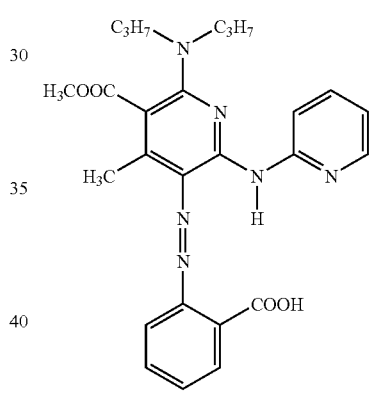
25.
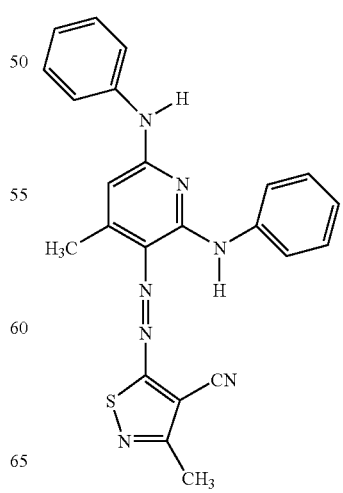

26.
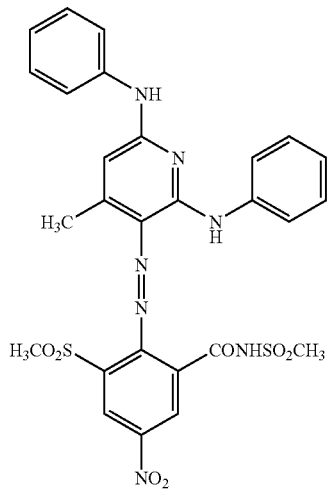
27.
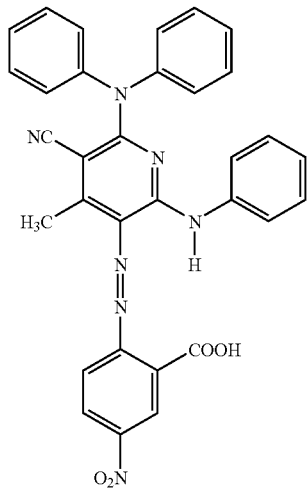
28.
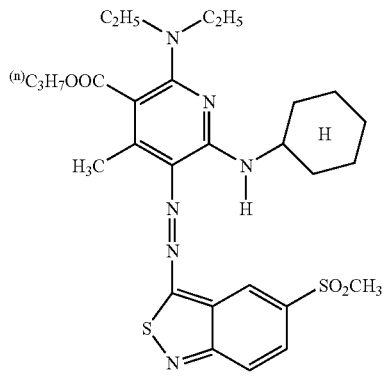
29.
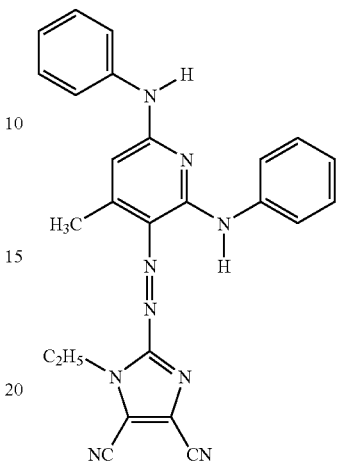
30.
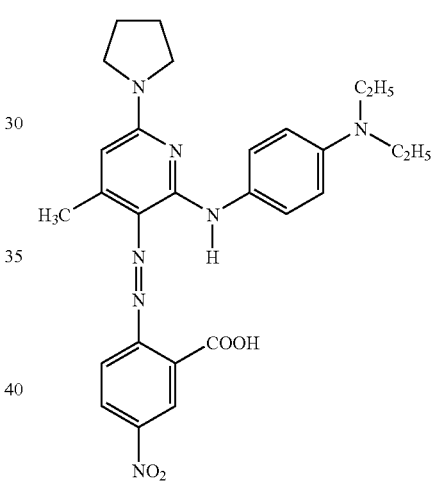
31.
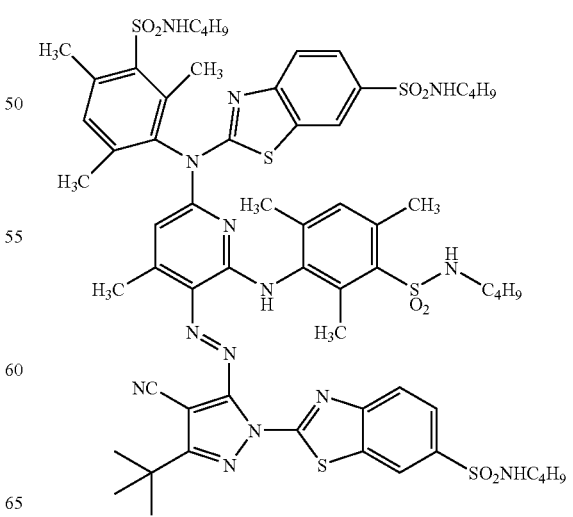

32.

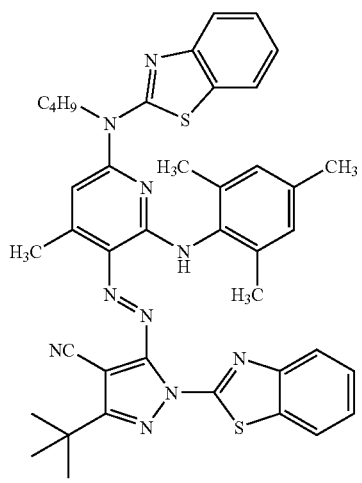

33.

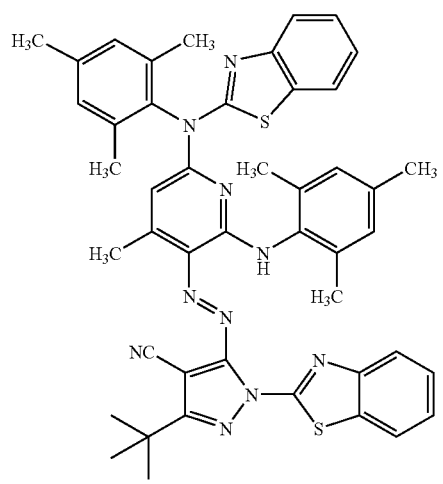

34.

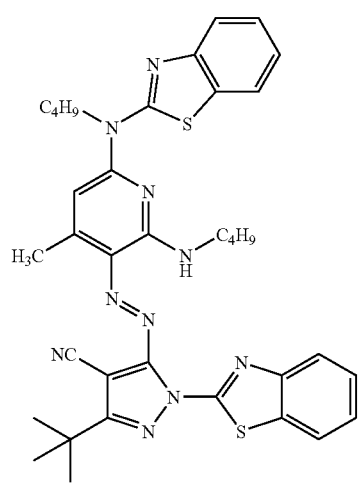

35.

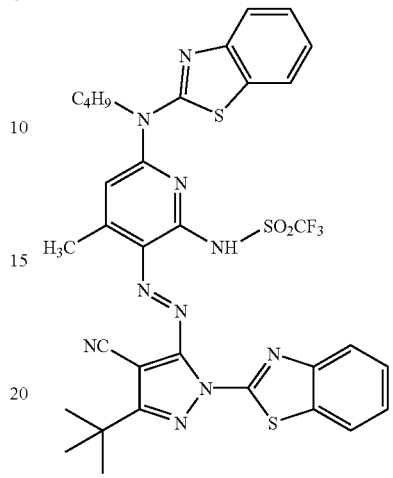

36.

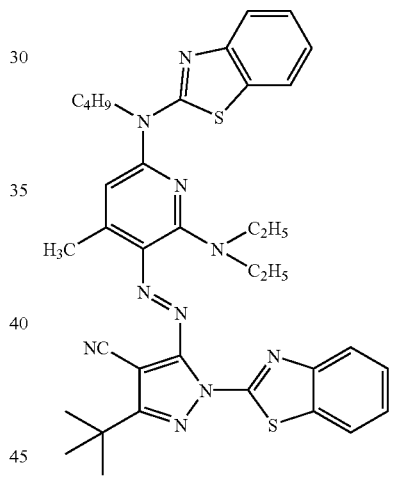

37. Ni chelate of dye 1
38. Zinc chelate of dye 2
39. Ni chelate of dye 5
40. Ni chelate of dye 8
41. Zinc chelate of dye 18
42. Copper chelate of dye 21
43. Ni chelate of dye 31
44. Ti chelate of dye 31
45. Zinc chelate of dye 31

The dye compounds used in the invention can be synthesized by synthesis methods which have hitherto been known. A general synthesis route is shown below. The synthesis methods are described in the following documents:

Patent Document 1: WO 02/83795
Patent Document 2: WO 02/83662

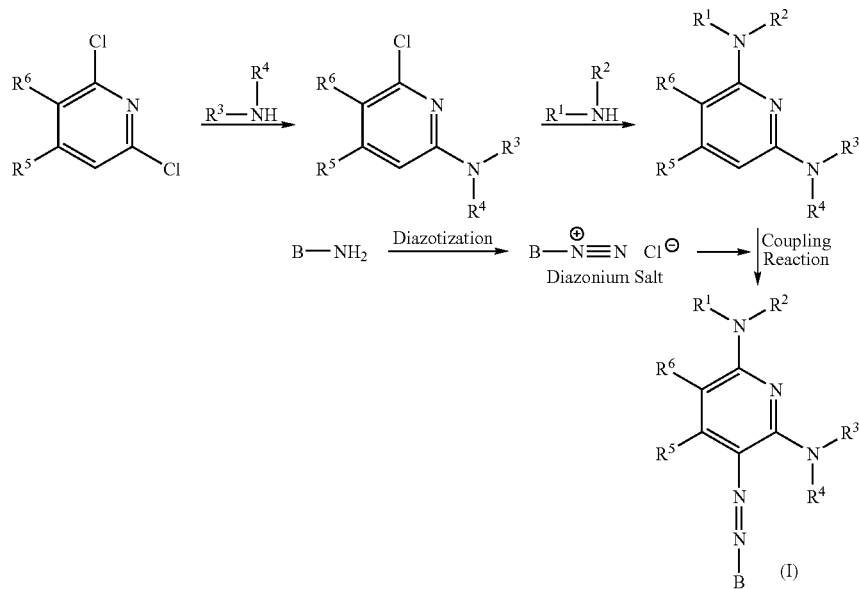

$R^1$ to $R^6$ and B of a synthesis intermediate have the same meanings as given for $R^1$ to $R^6$ and B of general formula (I). In the invention, a chelate azo dye formed from the above-mentioned azo dye represented by general formula (I) and a metal or a metal oxide can be used. As the metals, transition metals are preferred, and $Ni^{2+}$, $Co^{2+}$, $Zn^{2+}$, $Fe^{3+}$, $Al^{3+}$, $Cu^{2+}$ and $Cr^{3+}$ are preferred among others. Of these, $Ni^{2+}$, $Co^{2+}$ and $Zn^{2+}$ are particularly preferred.

In the optical recording disk of the invention, the above-mentioned dye of the invention ("the dye represented by general formula (I) and the metal azo chelate dye of the dye" are referred to as "the dye of the invention") may be used in combination with a dye for an optical recording disk which has hitherto been known. The dyes used in combination with the dye of the invention include an azo chelate dye, an oxonol dye, a cyanine dye and a phthalocyanine dye.

The optical information recording medium of the invention comprises the substrate having provided thereon the recording layer containing the above-mentioned dye of the invention. The optical information recording media of the invention include various constitutions. It is preferred that the optical recording medium of the invention has a recording layer, a light reflective layer and a protective layer, or a light reflective layer, a recording layer and a protective layer, in this order on a disk-shaped substrate on which pre-grooves are formed at a definite track pitch. Further, it is also preferred that the optical recording medium of the invention comprises two laminates each comprising a transparent disk-shaped substrate provided thereon a recording layer and a light reflective layer in this order, pre-grooves being formed on the substrate at a definite track pitch, the laminates being adhere to each other, facing the respective recording layers inside relative to the substrates.

When the optical recording medium of the invention is applied as the DVD-R type medium, two laminates each comprising a 0.6±0.1-mm thick transparent disk-shaped substrate having provided thereon a recording layer, pre-grooves being formed on the substrate at a track pitch of 0.6 to 0.9 µm, the recording layer being provided on the side where the pre-grooves are formed, are adhered to each other, facing the respective recording layers inside relative to the substrates. The depth of the pre-grooves is within the range of 0.05 to 100 µm, and preferably within the range of 0.1 to 50 µm.

When the optical recording medium of the invention is applied as an optical disk written with a laser having a wavelength of 450 nm or less, the track pitch is preferably within the range of 0.2 to 0.8 µm, more preferably within the range of 0.25 to 0.6 µm, and still more preferably within the range of 0.27 to 0.4 µm.

The depth of the pre-grooves is preferably within the range of 0.03 to 0.18 µm, more preferably within the range of 0.05 to 0.15 µm, and particularly preferably within the range of 0.06 to 0.1 µm.

Taking as an example the optical recording medium of the invention comprising the disk-shaped substrate having provided thereon the recording layer, the light reflective layer and the protective layer in this order, methods for producing the same will be described below.

The substrate of the optical recording medium of the invention can be arbitrarily selected from various materials used for the substrates of the conventional optical information recording media. The materials for the substrate include, for example, glass; a polycarbonate; an acrylic resin such as polymethyl methacrylate; a vinyl chloride resin such as polyvinyl chloride or a vinyl chloride copolymer; an epoxy resin; an amorphous polyolefin; and a polyester. They may be used in combination as so desired. These materials can be used in the film form or in the rigid substrate form. Of the above-mentioned materials, a polycarbonate is preferred in terms of moisture resistance, dimensional stability, cost, etc.

An undercoat layer may be provided on the surface of the substrate on which the recording layer is formed, for the purposes of improving planarity, enhancing adhesion and preventing deterioration of the recording layer. Materials for the undercoat layer include, for example, a polymer such as polymethyl methacrylate, an acrylic acid-methacrylic acid copolymer, a styrene-maleic anhydride copolymer, polyvinyl alcohol, N-methylolacrylamide, a styrene-vinyltoluene copolymer, chlorosulfonated polyethylene, nitrocellulose, polyvinyl chloride, a chlorinated polyolefin, a polyester, a polyimide, a vinyl acetate-vinyl chloride copolymer, an ethylene-vinyl acetate copolymer, polyethylene, polypropylene or a polycarbonate; and a surface modifier such as a silane coupling agent. The undercoat layer can be formed by dissolving or dispersing the above-mentioned material in an appropriate solvent to prepare a coating solution, and then, applying the resulting coating solution onto the surface of the substrate by a coating method such as spin coating, dip coating or extrusion coating. The thickness of the undercoat layer is generally within the range of 0.005 to 20 μm, and preferably within the range of 0.01 to 10 μm.

The recording layer can be formed by dissolving the above-mentioned dye compound (the dye of the invention and the dye used in combination therewith) and further optionally a quencher, a binder, etc. in a solvent to prepare a coating solution, and then, applying the resulting coating solution onto the surface of the substrate to form a coating film, followed by drying. The solvents for the coating solutions include an ester such as butyl acetate, ethyl lactate or cellosolve acetate; a ketone such as methyl ethyl ketone, cyclohexanone or methyl isobutyl ketone; a chlorinated hydrocarbon such as dichloromethane, 1,2-dichloroethane or chloroform; an amide such as dimethylformamide; a hydrocarbon such as methyl-cyclohexane; an ether such as dibutyl ether, diethyl ether, tetrahydrofuran or dioxane; an alcohol such as ethanol, n-propanol, isopropanol, n-butanol or diacetone alcohol; a fluorine solvent such as 2,2,3,3-tetrafluoropropanol; and a glycol ether such as ethylene glycol monomethyl ether, ethylene glycol monoethyl ether or propylene glycol monomethyl ether. The above-mentioned solvents can be used either alone or as a combination of two or more of them, considering the solubility of the dyes to be used. Various additives such as an antioxidant, an UV absorber, a plasticizer and a lubricant may be further added to the coating solution, depending on their purpose.

When the binder is used, examples thereof include a natural organic polymer such as gelatin, a cellulose derivative, dextran, rosin or rubber; and a synthetic organic polymer such as a hydrocarbon resin such as polyethylene, polypropylene, polystyrene or polyisobutylene; a vinyl resin such as polyvinyl chloride, polyvinylidene chloride or a vinyl chloride-vinyl acetate copolymer; an acrylic resin such as polymethyl acrylate or polymethyl methacrylate; polyvinyl alcohol; chlorinated polyethylene; an epoxy resin; a butyral resin; a rubber derivative; or an initial condensation product of a thermosetting resin such as a phenol-formaldehyde resin. When the binder is used as the material for the recording layer in combination with the dye, the amount of the binder is generally within the range of 0.01 to 50 times (by weight ratio), and preferably within the range of 0.1 to 5 times (by weight ratio), based on the amount of the dye. The concentration of the coating solution thus prepared is generally within the range of 0.01% to 10% by weight, and preferably within the range of 0.1% to 5% by weight.

Coating methods include spraying, spin coating, dip coating, roll coating, blade coating, doctor roll coating, screen printing, etc. The recording layer may be either a monolayer or a multilayer. The thickness of the recording layer is generally within the range of 20 to 500 nm, preferably within the range of 30 to 300 nm, and more preferably within the range of 50 to 100 nm.

The recording layer can be allowed to contain various fading inhibitors in order to improve the light resistance of recording layer. As the fading inhibitor, a singlet oxygen quencher is generally used. As the singlet oxygen quencher, an already known one described in a publication such as a patent specification can be utilized. Examples thereof include singlet oxygen quenchers described in JP-A-58-175693, JP-A-59-81194, JP-A-60-18387, JP-A-60-19586, JP-A-60-19587, JP-A-60-35054, JP-A-60-36190, JP-A-60-36191, JP-A-60-44554, JP-A-60-44555, JP-A-60-44389, JP-A-60-44390, JP-A-60-54892, JP-A-60-47069, JP-A-63-209995, JP-A-4-25492, JP-B-1-38680 (the term "JP-B" as used herein means an "examined Japanese patent publication"), JP-B-6-26028, German Patent 350399, J. Chem. Soc. Japan, October, 1141 (1992), etc. Preferred examples of the singlet oxygen quenchers include a compound represented by the following general formula (III):

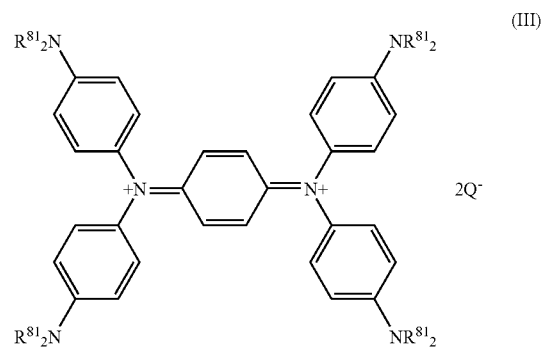

wherein $R^{81}$ represents an alkyl group which may have a substituent, and $Q^-$ represents an anion.

In general formula (III), $R^{81}$ is preferably an alkyl group having 1 to 8 carbon atoms, which may be substituted, and more preferably an unsubstituted alkyl group having 1 to 6 carbon atoms. Substituent groups for the alkyl group include a halogen atom (for example, F or Cl), an alkoxyl group (for example, methoxy or ethoxy), an alkylthio group (for example, methylthio or ethylthio), an acyl group (for example, acetyl or propionyl), an acyloxy group (for example, acetoxy or propionyloxy), a hydroxyl group, an alkoxycarbonyl group (for example, methoxycarbonyl or ethoxycarbonyl), an alkenyl group (for example, vinyl) and an aryl group (for example, phenyl or naphthyl). Of these, a halogen atom, an alkoxyl group, an alkylthio group and an alkoxycarbonyl group are preferred. Preferred examples of the anions represented by $Q^-$ include $CO_4^-$, $AsF_6^-$, $BF_4^-$ and $SbF_6^-$.

Examples of the compounds represented by general formula (III) are shown in Table 1.

TABLE 1

| Compound No. | $R^{81}$ | $Q^-$ |
|---|---|---|
| II-1 | $CH_3$ | $ClO_4^-$ |
| II-2 | $C_2H_5$ | $ClO_4^-$ |
| II-3 | $n\text{-}C_3H_7$ | $ClO_4^-$ |
| II-4 | $n\text{-}C_4H_9$ | $ClO_4^-$ |
| II-5 | $n\text{-}C_5H_{11}$ | $ClO_4^-$ |
| II-6 | $n\text{-}C_4H_9$ | $SbF_6^-$ |
| II-7 | $n\text{-}C_4H_9$ | $BF_4^-$ |
| II-8 | $n\text{-}C_4H_9$ | $AsF_6^-$ |

The fading inhibitor such as the above-mentioned singlet oxygen quencher is used usually in an amount ranging from 0.1% to 50% by weight, preferably in an amount ranging from 0.5% to 45% by weight, more preferably in an amount ranging from 3% to 40% by weight, and particularly preferably in an amount ranging from 5% to 25% by weight.

The light reflective layer is preferably provided next to the recording layer for the purpose of improving the reflectance in the reproduction of information. Light reflective materials, materials for the light reflective layer, are materials having high reflectance to the laser beams, and examples thereof include metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, and stainless steel. These materials may be used either alone or as a combination of two or more of them. Further, they may also be used as alloys. Of these, preferred are Cr, Ni, Pt, Cu, Ag, Au, Al and stainless steel, particularly preferred are Au metal, Ag metal, Al metal and alloys thereof, and most preferred are Ag metal, Al metal and alloys thereof. The light reflective layer can be formed on the substrate or the recording layer, for example, by vapor deposition, sputtering or ion plating of the above-mentioned light reflective material. The thickness of the light reflective layer is generally within the range of 10 to 300 nm, and preferably within the range of 50 to 200 nm.

On the light reflective layer or the recording layer, the protective layer is preferably provided for the purpose of protecting the recording layer etc. physically and chemically. When a form similar to the DVD-R type optical information recording medium is taken, that is to say, when the structure is taken that two substrates are adhered to each other, facing the recording layer inside relative to the substrates, the protective layer is not necessarily required to be provided. Examples of materials used in the protective layer include inorganic materials such as SiO, $SiO_2$, $MgF_2$, $SnO_2$ and $Si_3N_4$, and organic materials such as a thermoplastic resin, a thermosetting resin and an UV-curing resin. The protective layer can be formed, for example, by laminating a film obtained by extrusion of a plastic on the reflective layer with through an adhesive. Alternatively, it may be provided by a method such as vacuum vapor deposition, sputtering or coating. Further, in the case of the thermoplastic resin or the thermosetting resin, the protective layer can also be formed by dissolving the resin in an appropriate solvent to prepare a coating solution, and then, applying the resulting coating solution, followed by drying. In the case of the UV-curing resin, the protective layer can also be formed by applying the resin as such, or dissolving the resin in an appropriate solvent to prepare a coating solution, and applying the resulting coating solution, followed by irradiation of UV light to cure the resin. Various additives such as an antistatic agent, an antioxidant and an UV absorber may be further added to the coating solution depending on its purpose. The thickness of the protective layer is generally within the range of 0.1 μm to 1 mm. According to above-mentioned process, the laminate comprising the substrate having provided thereon the recording layer, the light reflective layer and protective layer in this order, or the light reflective layer, recording layer and the protective layer in this order can be produced.

The information recording method of the invention is conducted using the above-mentioned optical information recording medium, for example, in the following manner. First, the optical information recording medium is irradiated from the substrate side thereof with light for recording such as a semiconductor laser beam, while rotating the medium at a constant linear speed or at a constant angular speed. It is considered that this light irradiation results in absorption of the light by the recording layer to cause a local temperature rise, which produces a physical or chemical change (for example, formation of pits) to alter the optical characteristics thereof, thereby recording the information. When the invention is applied to the DVD-R type recording medium, as the recording light, there is used a semiconductor laser beam having an oscillation wavelength ranging from 600 to 700 nm, preferably from 620 to 680 nm, and more preferably from 630 to 670 nm.

Further, it is also preferred that the invention is applied to the optical recording disk for which a semiconductor laser beam having an oscillation wavelength ranging from 390 to 550 nm is used as the recording light. Preferred examples of light sources used in that case include a blue-violet semiconductor laser having an oscillation wavelength ranging from 390 to 415 nm, a blue-green semiconductor laser having an oscillation wavelength of 515 nm and a blue-violet SHG laser having an oscillation wavelength of 425 nm in which the wavelength of an infrared semiconductor laser having an oscillation wavelength of 850 nm is reduced to half by using a light guide element. In terms of recording density, the use of the blue-violet semiconductor laser and the SHG laser is particularly preferred among others. The information recorded as described above can be reproduced by irradiating the optical information recording medium from the substrate side thereof or the protective layer side thereof with a semiconductor laser beam, while rotating the medium at the same constant linear speed as described above, and detecting the reflective light thereof.

EXAMPLES

The invention will be illustrated in greater detail with reference to the following examples, but the invention should not be construed as being limited thereto.

Example 1

Dye 1 shown before was dissolved in 2,2,3,3-tetrafluoropropanol to prepare a coating solution for recording layer formation having a dye concentration of 1% by weight. On the other hand, a polycarbonate substrate (diameter: 120 mm, thickness: 0.6 mm) having spiral pre-grooves (track pitch: 0.8 μm, groove width: 0.4 μm, groove depth: 0.15 μm) on a surface thereof was formed by injection molding. The coating solution was applied by spin coating onto the surface of the substrate on which the spiral pre-grooves were formed to form a recording layer (thickness at the inside of the pre-groove: 200 nm).

Then, silver was sputtered on the recording layer to form a light reflective layer having a thickness of about 100 nm, thus preparing a laminate comprising the substrate having provided thereon the recording layer and the light reflective layer in this order. Separately, a transparent polycarbonate substrate (disk-shaped protective substrate, diameter: 120 mm, thickness: 0.6 mm) was prepared. The laminate obtained above and the disk-shaped protective substrate were adhered to each other with an adhesive (manufactured by Three Bond Co., Ltd.), facing the recording layer inside. According to the above-mentioned process, a DVD-R type optical recording disk (thickness: 1.2 mm) of the invention was produced.

Examples 2 to 13 and Comparative Example 1

Optical disks for evaluation were prepared in the same manner as with Example 1 with the exception that dyes described in Table 2 shown below were used in place of dye 1.

[Evaluation as Optical Disk]

14T-EFM signals were recorded on each of the DVD-R type optical recording disks prepared, with a semiconductor laser having an oscillation wavelength of 635 nm at a linear speed of 3.68 m/second, and then, the recorded signals were reproduced. The modulation degree at an optimum power, the groove reflectance and the sensitivity were measured. Recording and evaluations of recording characteristics were made with an OMT 2000 device manufactured by Pulstec Industrial Co., Ltd.

Each optical disk prepared above was irradiated for 3 days using a merry-go-round type fadeometer of 100,000 luxes without using an UV filter to conduct a light resistance test. Results shown in Table 2 reveal that the optical recording disks having the azo dye-containing recording layers characterized in the invention (Examples 1 to 13) are excellent in light resistance, compared to the optical recording disk having the comparative compound a-containing recording layer (Comparative Example 1).

All disks were high in modulation degree and high in sensitivity.

TABLE 2

| | Dye Compound of Recording Layer | Photofading (Residual Ratio) |
|---|---|---|
| Example 1 | 1 | 93 |
| Example 2 | 2 | 92 |
| Example 3 | 3 | 89 |
| Example 4 | 12 | 90 |
| Example 5 | 20 | 91 |
| Example 6 | 21 | 92 |
| Example 7 | 28 | 89 |
| Example 8 | 31 | 93 |
| Example 9 | 32 | 94 |
| Example 10 | 37 | 97 |
| Example 11 | 39 | 98 |
| Example 12 | 43 | 97 |
| Example 13 | 44 | 98 |
| Comparative Example 1 | a | 88 |

Comparative Compound a: Dye described in JP-A-11-166125

Ni chelate dye of

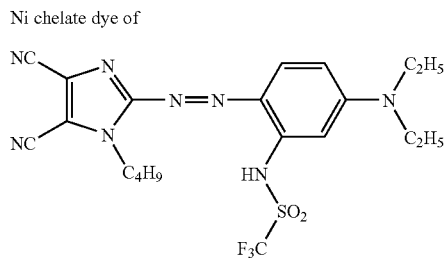

The use of the dyes of the invention makes it possible to obtain the optical information recording media showing high reflectance to the laser beams, giving high modulation degree, and having high sensitivity and excellent light resistance.

The entire disclosure of each and every foreign patent application from which the benefit of foreign priority has been claimed in the present application is incorporated herein by reference, as if fully set forth.

What is claimed is:

1. An optical information recording medium comprising a substrate having provided thereon a recording layer capable of recording information by laser beam irradiation, wherein the recording layer contains, as a major component, a nonmetal azo dye represented by the following general formula (I):

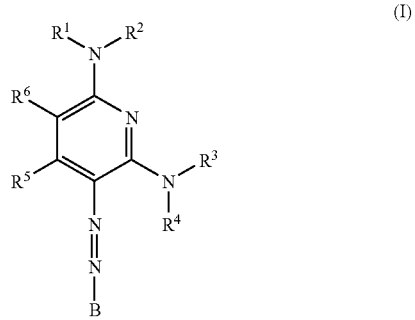

wherein $R^1$, $R^2$, $R^3$ and $R^4$ each independently represents a hydrogen atom or a substituent group; $R^5$ and $R^6$ each independently represents a hydrogen atom or a substituent group; and B represents a substituted or unsubstituted aryl group or a substituted or unsubstituted heterocyclic group, which are derivable from a diazonium salt, wherein the optical information recording medium has an improved recording and reproducing property with a laser beam having a wavelength ranging from 390 to 415 nm, and wherein a surface of said substrate to which said recording layer is provided has pregrooves.

2. The optical information recording medium according to claim 1, wherein $R^1$, $R^2$, $R^3$ and $R^4$ in general formula (I) each independently represents a hydrogen atom, a substituted or unsubstituted alkyl group, a substituted or unsubstituted aryl group or a substituted or unsubstituted heterocyclic group; $R^5$ and $R^6$ each independently represents a hydrogen atom or a substituent group; and B represents a substituted or unsubstituted aryl group or a substituted or unsubstituted heterocyclic group, which are derivable from a diazonium salt.

3. The optical information recording medium according to claim 1, wherein the refractive index (n) of the recording layer is 2.0<n<2.7, and the linear attenuation coefficient (k) thereof is 0.03<k<0.10.

4. The optical information recording medium according to claim 1, wherein the dye represented by general formula (I) is represented by the following general formula (II):

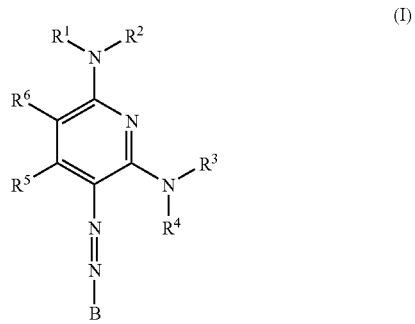

wherein $R^1$, $R^2$ and $R^3$ each independently represents a hydrogen atom, a substituted or unsubstituted alkyl group, a substituted or unsubstituted aryl group or a substituted or unsubstituted heterocyclic group; $R^5$ and $R^6$ each independently represents a hydrogen atom or a substituent group; and B' represents a group having a structure selected from the following formulas (a)-1, (a)-2 and (b) to (l):

(a)-1 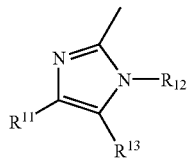

(a)-2 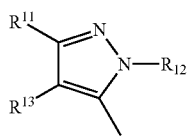

(b) 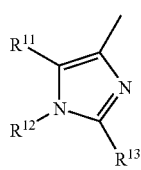

(c) 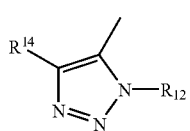

(d) 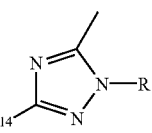

(e) 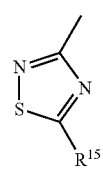

(f) 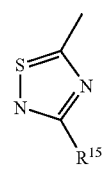

(g) 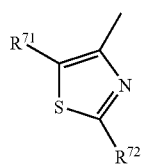

(h) 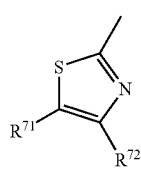

-continued (i) 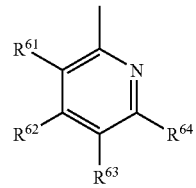

(j) 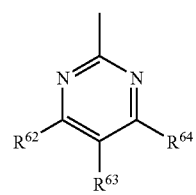

(k) 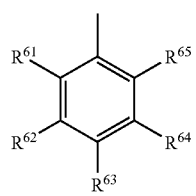

(l) 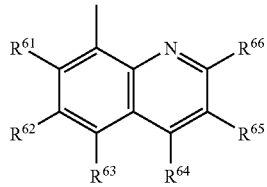

wherein $R^{11}, R^{12}, R^{13}, R^{14}, R^{15}, R^{61}, R^{62}, R^{63}, R^{64}, R^{65}, R^{66}, R^{71}$ and $R^{72}$ each independently represents a hydrogen atom or a substituent group.

5. The optical information recording medium according to claim 1, wherein either of $R^3$ and $R^4$ is a substituted or unsubstituted alkyl group having 1 to 20 carbon atoms or a substituted or unsubstituted aryl group having 6 to 20 carbon atoms, and the other is a hydrogen atom.

6. The optical information recording medium according to claim 1, wherein $R^5$ is a hydrogen atom, a substituted or unsubstituted alkyl group having 1 to 20 carbon atoms or a substituted or unsubstituted aryl group having 6 to 20 carbon atoms.

7. The optical information recording medium according to claim 1, wherein $R^6$ is a hydrogen atom, an unsubstituted alkyl group having 1 to 6 carbon atoms, a substituted or unsubstituted alkoxycarbonyl group having 2 to 20 carbon atoms, a substituted or unsubstituted aminocarbonyl group having 3 to 20 carbon atoms, a carboxyl group or a cyano group.

8. An optical information recording medium comprising a substrate having provided thereon a recording layer capable of recording information by laser beam irradiation, wherein the recording layer contains a non-metal azo dye represented by the following general formula (I):

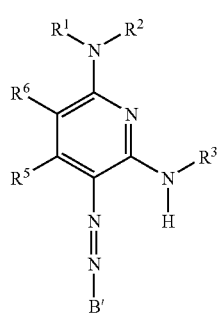
(II)

wherein $R^1$, $R^2$, $R^3$ and $R^4$ each independently represents a hydrogen atom or a substituent group; $R^5$ represents an unsubstituted alkyl group having 1 to 6 carbon atoms; $R^6$ represents a hydrogen atom or a substituent group; and B represents a substituted or unsubstituted aryl group or a substituted or unsubstituted heterocyclic group, which are derivable from a diazonium salt, wherein the optical information recording medium has an improved recording and reproducing property with a laser beam having a wavelength ranging from 390 to 415 nm, and wherein a surface of said substrate to which said recording layer is provided has pregrooves.

* * * * *